US012421405B2

(12) United States Patent
Andre et al.

(10) Patent No.: US 12,421,405 B2
(45) Date of Patent: Sep. 23, 2025

(54) RADIATION CURABLE COMPOSITION FOR PLATING APPLICATIONS

(71) Applicant: AGFA-GEVAERT NV, Mortsel (BE)

(72) Inventors: Romane Andre, Mortsel (BE); Fernando Cortes Salazar, Mortsel (BE); Mark Lens, Mortsel (BE); Hubertus Van Aert, Mortsel (BE); Johan Loccufier, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 572 days.

(21) Appl. No.: 17/637,882

(22) PCT Filed: Aug. 6, 2020

(86) PCT No.: PCT/EP2020/072181

§ 371 (c)(1),
(2) Date: Feb. 24, 2022

(87) PCT Pub. No.: WO2021/037521

PCT Pub. Date: Mar. 4, 2021

(65) Prior Publication Data

US 2022/0289991 A1 Sep. 15, 2022

(30) Foreign Application Priority Data

Aug. 26, 2019 (EP) .................................... 19193583

(51) Int. Cl.

| | |
|---|---|
| ***C09D 11/101*** | (2014.01) |
| ***B41M 3/00*** | (2006.01) |
| ***C09D 11/107*** | (2014.01) |
| ***C09D 11/30*** | (2014.01) |
| ***C23C 18/16*** | (2006.01) |
| ***C23C 18/32*** | (2006.01) |

(52) U.S. Cl.

CPC ........... *C09D 11/101* (2013.01); *B41M 3/006* (2013.01); *C09D 11/107* (2013.01); *C09D 11/30* (2013.01); *C23C 18/1605* (2013.01); *C23C 18/1637* (2013.01); *C23C 18/32* (2013.01)

(58) Field of Classification Search

CPC ...... C09D 11/101; C09D 11/107; C09D 11/30
USPC .......................................................... 526/279
See application file for complete search history.

(56) References Cited

U.S. PATENT DOCUMENTS

| | | | | |
|---|---|---|---|---|
| 5,230,969 A * | 7/1993 | Savant | G03H 1/02 430/289.1 |
| 5,587,405 A | 12/1996 | Tanaka et al. | |
| 5,700,585 A * | 12/1997 | Lee | C08J 7/043 525/227 |
| 2006/0049129 A1 | 3/2006 | Hopper et al. | |
| 2011/0024392 A1 | 2/2011 | Sato et al. | |
| 2017/0226355 A1 * | 8/2017 | Torfs | B41M 5/0047 |

FOREIGN PATENT DOCUMENTS

| | | | | |
|---|---|---|---|---|
| CN | 1084193 A | 3/1994 | |
| CN | 101978001 A | 2/2011 | |
| CN | 106715607 A | 5/2017 | |
| EP | 0588534 B1 | 12/1998 | |
| EP | 1911814 * | 4/2008 | C09D 11/00 |
| EP | 3000853 A1 | 3/2016 | |
| EP | 3498788 A1 | 6/2019 | |
| JP | H06-93222 A | 4/1994 | |
| JP | 2013-23563 A | 2/2013 | |
| TW | 200905012 A | 2/2009 | |
| TW | 201807111 A | 3/2018 | |
| WO | WO 2016/050371 A1 | 4/2016 | |
| WO | WO 2016/050372 A1 | 4/2016 | |
| WO | WO 2016/050504 A1 | 4/2016 | |
| WO | WO 2019/121098 A1 | 6/2019 | |

OTHER PUBLICATIONS

European Patent Office, International Search Report in International Patent Application No. PCT/EP2020/072181, mailed Sep. 17, 2020, 3 pp.

European Patent Office, Written Opinion in International Patent Application No. PCT/EP2020/072181, mailed Sep. 17, 2020, 4 pp.

* cited by examiner

*Primary Examiner* — Margaret G Moore

(74) *Attorney, Agent, or Firm* — Leydig, Voit & Mayer, Ltd.

(57) ABSTRACT

A radiation curable composition comprising: a) at least one monofunctional (meth)acrylate containing a carboxylic acid group, a phosphoric acid group or a phosphonic acid group; b) an acrylamide; c) at least one polyfunctional (meth) acrylate; characterized in that the radiation curable composition further comprises at least 0.1 wt % of a liquid penetrating controlling monomer selected from the group consisting of a C6-C20 alkyl (meth)acrylate, a fluorinated (meth)acrylate and a silicone (meth)acrylate.

13 Claims, No Drawings

RADIATION CURABLE COMPOSITION FOR PLATING APPLICATIONS

CROSS-REFERENCE TO RELATED APPLICATIONS

This patent application is the U.S. national phase of copending International Patent Application No. PCT/EP2020/072181, filed Aug. 6, 2020, which claims the benefit of European Patent Application No. 19193583.2, filed Aug. 26, 2019.

TECHNICAL FIELD OF THE INVENTION

The present invention relates to a radiation curable composition, preferably a UV curable inkjet ink, for use in various plating applications, such as for example used in PCB manufacturing.

BACKGROUND ART FOR THE INVENTION

The production workflow of printed circuit boards (PCBs) is gradually shifting from the standard workflow towards a digital workflow to reduce the amount of process steps and lowering the cost and the environmental impact of the production of PCBs. A digital workflow further enables the possibility for short run manufacturing or even the production of individual elements without a significant increase of the cost. Going from an analogue to a digital workflow has thus clear economic and environmental benefits.

Inkjet printing is proposed as one of the preferred digital manufacturing technologies for different steps of the PCB manufacturing process going from etch resist over solder mask to legend printing. Preferred inkjet inks are UV curable ink jet inks.

Several plating processes are also used in PCB manufacturing, such as for example copper plating, nickel plating, gold plating, etc.

The ENIG (Electroless Nickel Immersion Gold) plating process is a surface finishing process commonly used in PCB manufacturing.

The ENIG process consist of the deposition of a thin layer of nickel and gold on the exposed copper areas within the PCB in order to provide a good solderability and a good protection to oxidation.

One of the issues with ENIG process is its cost, due to the use of expensive metals such as gold. Since not all the exposed copper areas need to be protected, a digital workflow will be more cost effective. Such a digital workflow also enables the production of PCBs with different surface finishes, for example ENIG and immersion tin.

To perform such a digital workflow, a protection layer needs to be deposited on the copper parts that do not need to be plated. The nickel and gold deposit occurs then only on the exposed copper parts and finally, the protection layer has to be removed (stripped away) to have a final board.

When using an inkjet ink as etch resist, solder mask, legend ink, or plating resist, the adhesion of the jetted and cured inkjet ink towards different substrates is of crucial importance. Moreover, when used as an etch resist or plating resist, the ink layer (protection layer) has to be fully removed after etching or plating.

When used as plating resist in the ENIG process, the challenge for the protection layer is to withstand the strong and varying conditions (pH, temperature) used during the ENIG process, while being fully removed during the stripping step.

WO2016/050504 (Agfa Gevaert NV) discloses an etch-resistant UV curable inkjet ink for manufacturing conductive patterns. The polymerizable composition of the ink consists of 15 to 70 wt % of an acryl amide; 20 to 75 wt % of a polyfunctional acrylate; and 1 to 15 wt % of a monofunctional (meth)acrylate containing a carboxylic acid group, a phosphoric acid group or a phosphonic acid group. A similar UV curable inkjet ink is disclosed in WO2016/050372 (Agfa NV and Agfa Gevaert NV) for manufacturing an embossing element for decorative purposes and in WO2016/050371 (Agfa Gevaert NV) for the digital fabrication of metallic articles. In the latter application, the digital fabrication may comprise an etching or a plating step. However, no examples are disclosed that use plating to manufacture the metallic articles and no information is disclosed on specific compositions of plating baths, especially regarding the pH values. All disclosed etch resistant inkjet inks are compatible with an acidic etching step (pH lower than 3) followed by a moderate to strong alkaline stripping step.

To extend the scope of applications of inkjet technology in the manufacture of PCBs there is a need for an inkjet ink that perform well as plating resist, especially in the ENIG plating process.

Now it has been found that a radiation curable composition according to the present invention can realize the objects of the present invention.

SUMMARY OF THE INVENTION

It is an object of the invention to provide a radiation curable composition that may be used as a plating resist in the manufacture of PCBs, more specifically a plating resist that performs well in the ENIG process.

That object of the invention is realized by the radiation curable composition according to claim 1.

It is another object of the invention to provide a method of manufacturing a PCB.

That object of the invention is realized by the method according to claim 9.

Further objects of the invention will become apparent from the description hereinafter.

DETAILED DESCRIPTION OF THE INVENTION

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyipropyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted alkaryl group is preferably a phenyl or naphthyl group including one, two, three or more $C_1$ to $C_6$-alkyl groups.

Unless otherwise specified a substituted or unsubstituted aralkyl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —CI, —Br, —I, —OH, —SH, —CN and —NO2.

Radiation Curable Composition

The radiation curable composition according to the present invention comprises:

a) an acrylamide;
b) at least one monofunctional (meth)acrylate containing a carboxylic acid group, a phosphoric acid group or a phosphonic acid group;
c) at least one polyfunctional (meth)acrylate;

characterized in that the radiation curable composition further comprises d) at least 0.1 wt % of a liquid penetrating controlling monomer selected from the group consisting of a long chain alkyl (meth)acrylate, a fluorinated (meth)acrylate and a silicone (meth)acrylate.

The radiation curable composition may further comprise other ingredients such as a photoinitiating system, colorants, polymeric dispersants, a polymerization inhibitor, a flame retardant or a surfactant.

The radiation curable composition may be cured by any type of radiation, for example by electron-beam radiation, but is preferably cured by UV radiation, more preferably by UV radiation from UV LEDs. The radiation curable composition is thus preferably a UV curable composition.

The radiation curable composition is preferably a radiation curable inkjet ink, more preferably a UV curable inkjet ink.

For reliable industrial inkjet printing, the viscosity of the inkjet ink is preferably no more than 20 mPa·s at 45° C., more preferably between 1 and 18 mPa·s at 45° C., and most preferably between 4 and 14 mPa·s at 45° C., all at a shear rate of 1000 $s^{-1}$ .

A preferred jetting temperature is between 10 and 70° C., more preferably between 20 and 55° C., and most preferably between 25 and 50° C.

For good image quality and adhesion, the surface tension of the inkjet ink is preferably in the range of 18 to 70 mN/m at 25° C., more preferably in the range of 20 to 40 mN/m at 25° C.

Acryl Amide

The radiation curable composition according to the present invention includes an acryl amide.

The amount of the acryl amide is preferably at least 7.5 to 60 wt %, more preferably at least 15 to 50 wt % and most preferably at least 20 to 40 wt % of an acryl amide, with all weight percentages (wt %) based on the total weight of the radiation curable composition.

An acryl amide referred to herein has a chemical structure according to Formula I, Formula I

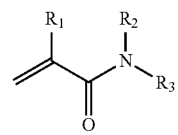

wherein $R_1$ represents a hydrogen or a methyl group, $R_2$ and $R_3$ represents a hydrogen, a substituted or unsubstituted alkyl group, a substituted or unsubstituted alkenyl group, a substituted or unsubstituted aralkyl group, a substituted or unsubstituted alkaryl group, a substituted or unsubstituted aryl group, or a substituted or a unsubstituted heteroaryl group, $R_2$ and $R_3$ may represent the necessary atom to form a 5 to 8 membered ring.

Preferably, $R_1$ represents a hydrogen and $R_2$ and $R_3$ have the necessary atoms to form a 5 to 8 membered ring.

A single acryl amide or a mixture of acryl amides may be used.

Preferred acryl amides are disclosed in Table 1.

TABLE 1

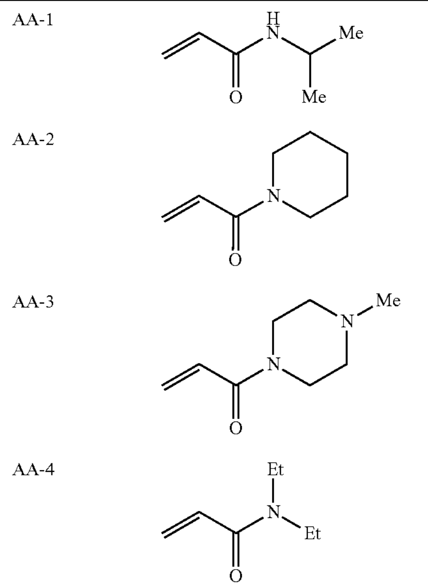

TABLE 1-continued

| | |
|---|---|
| AA-5 | 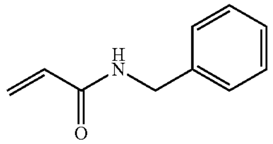 |
| AA-6 | 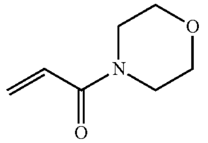 |
| AA-7 | 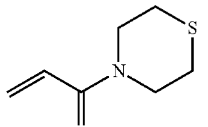 |
| AA-8 | 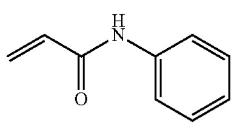 |
| AA-9 | 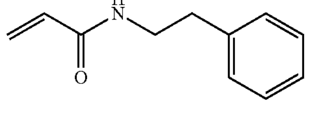 |
| AA-10 | 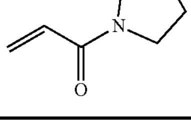 |

A highly preferred acryl amide according to Formula I is acryloyl morpholine (ACMO).

Acid Group Containing (Meth)Acrylates

The radiation curable composition according to the present invention comprises a (meth)acrylate containing a carboxylic acid group, a phosphoric acid group or a phosphonic acid group; or a mixture thereof.

The amount of the (meth)acrylate containing a carboxylic acid group, a phosphoric acid group or a phosphonic acid group is preferably between 1 and 25 wt %, more preferably between 3 and 20 wt %, most preferably between 5 to 15 wt %, with all weight percentages (wt %) based on the total weight of the radiation curable composition.

It has been observed that such (meth)acrylates containing a carboxylic acid group, a phosphoric acid group or a phosphonic acid group may improve the adhesion of the jetted and cured radiation curable compositions on various substrates. These compounds are therefore also referred to as adhesion promoters.

Suitable examples of a carboxylic acid group-containing (meth)acrylate include a compound represented by the Formula (II):

Formula II

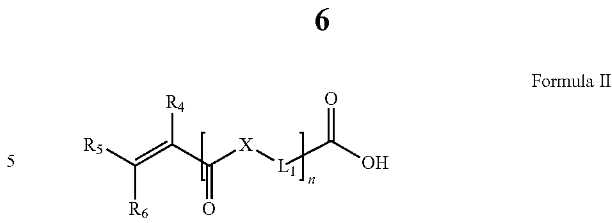

wherein n is 0 or 1, $R_4$ is selected from the group consisting of a hydrogen atom, a substituted or unsubstituted alkyl group and a substituted or unsubstituted aryl group.

$L_1$ represents a divalent linking group, comprising 20 carbon atoms or less, with the proviso that Li is linked to the carboxylic acid via an aliphatic carbon atom, X represents O or $NR_7$, $R_7$ is selected from the group consisting of a hydrogen atom, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted (hetero)aryl group, $R_7$ and $L_1$ may represent the necessary atoms to form a 5 to 8 membered ring.

$R_5$ and $R_6$ are independently selected from the group consisting of hydrogen, a substituted or unsubstituted alkyl group, a substituted or unsubstituted aryl group and a substituted or unsubstituted heteroaryl group.

$R_4$ is preferably a hydrogen atom or a substituted or unsubstituted C1 to C4 alkyl group, more preferably a hydrogen atom or a methyl group, a hydrogen atom being particularly preferred.

X is preferably an oxygen atom or NH, an oxygen atom being particularly preferred.

$L_1$ preferably represents a substituted or unsubstituted alkylene group, an unsubstituted alkylene group being particularly preferred.

The adhesion promoter according to Formula II, or a salt thereof, may copolymerize with other polymerizable compounds of the radiation curable inkjet ink.

Examples of adhesion promoters according to Formula II are given in Table 2.

TABLE 2

| | |
|---|---|
| 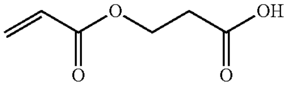 | ADH-1 |
| 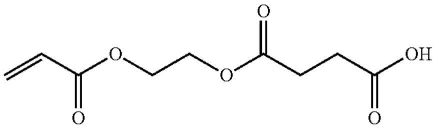 | ADH-2 |
| 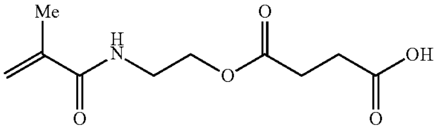 [SMILES: C=C(C)C(=O)NCCOC(=O)CCC(=O)O] | ADH-3 |
| 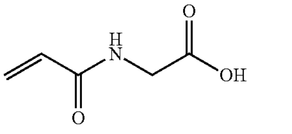 | ADH-4 |

TABLE 2-continued

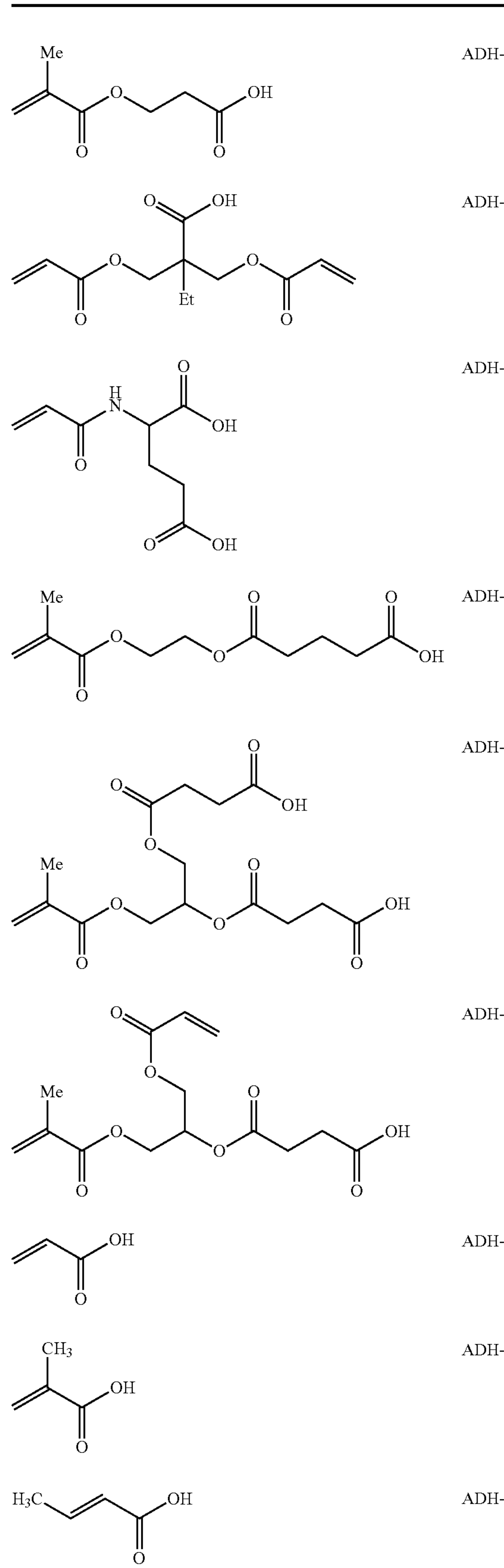

TABLE 2-continued

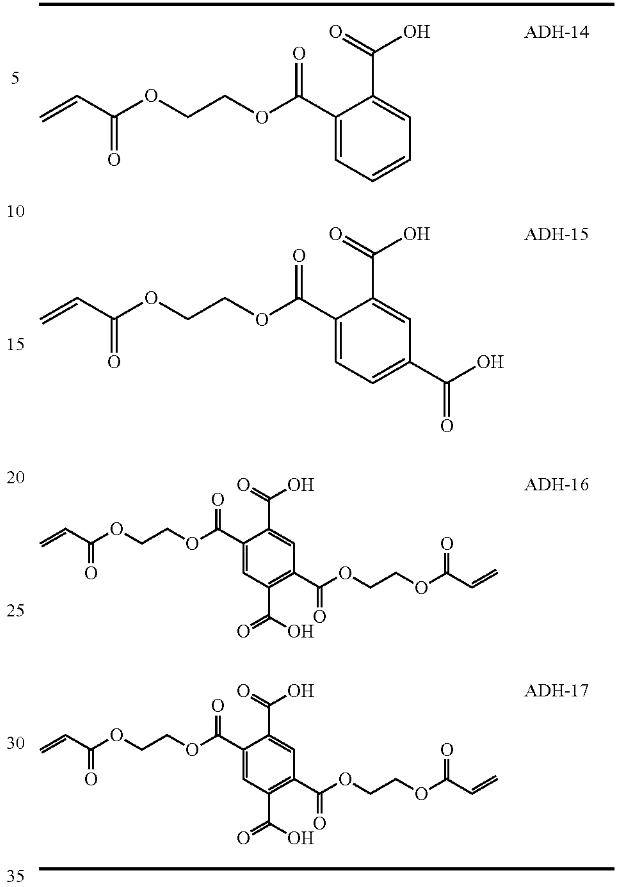

Preferred examples of a (meth)acrylate containing a phosphoric acid group or a phosphonic acid group include 2-(methacryloyloxy)ethyl phosphate, hydroxyethyl methacrylate phosphate, bis-(2-methacryloyl oxyethyl) phosphate.

Preferred examples of the (meth)acrylate containing a phosphoric acid group are compounds according to Formula P-1 or P-2:

Formula P-1

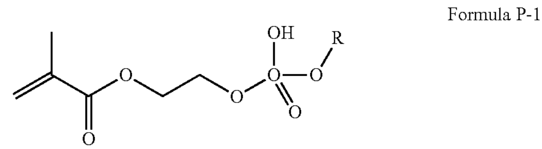

Formula P-2

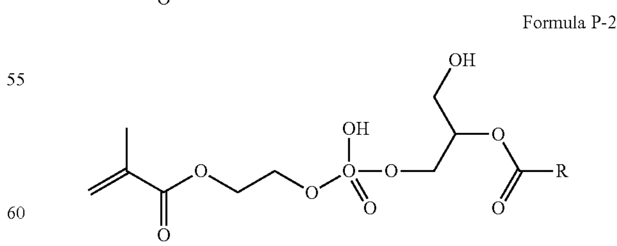

wherein R represents $C_nH_{2n+1}$ with n representing an integer between 6 and 18.

Preferred examples of the (meth)acrylate containing a phosphoric acid group are disclosed in Table 3.

TABLE 3

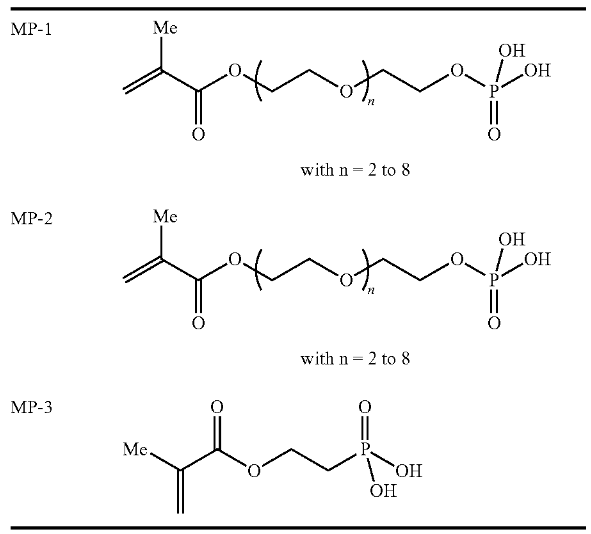

In a particularly preferred embodiment of the UV curable inkjet ink, the (meth)acrylate containing a carboxylic acid group, a phosphoric acid group, or a phosphonic acid group is selected from the group consisting of acrylic acid, 2-carboxyethyl acrylate, 2-acryloyl ethyl succinate, and 2-hydroxyethyl methacrylate phosphate, or a mixture thereof.

Polyfunctional Acrylates

The radiation curable composition according to the present invention includes a polyfunctional acrylate.

The amount of the polyfunctional acrylate is preferably between 15 and 65 wt %, preferably between 20 and 55 wt % and most preferably between 30 and 50 wt % of a polyfunctional acrylate, with all weight percentages (wt %) based on the total weight of the radiation curable composition.

A single polyfunctional acrylate or a mixture of polyfunctional acrylates may be used.

In a preferred embodiment, the polyfunctional acrylate is selected from the group consisting of dipropylene glycol diacrylate, neopentylglycol diacrylate , neopentylglycol (2× propoxylated) diacrylate, penta erythritol tetraacrylate, 1,6-hexanediol diacrylate, trimethylolpropane triacrylate, ethoxylated trimethylolpropane triacrylate, tripropylene glycol diacrylate, ditrimethyloylpropane tetraacrylate, ethoxylated pentaerythritol tetraacrylate, and polyethyleneglycol diacrylate.

In the most preferred embodiment of the UV curable inkjet ink, the polyfunctional acrylate includes a neopentylglycol hydroxy pivalate diacrylate.

Liquid Penetrating Controlling Monomer

The radiation curable composition comprises at least 0.1 wt % of a liquid penetrating controlling monomer selected from the group consisting of a long chain alkyl (meth) acrylate, a fluorinated (meth)acrylate and a silicone (meth) acrylate, or a mixture thereof, the wt % relative to the total weight of the radiation curable composition.

The amount of the liquid penetrating controlling monomer is preferably at least 0.1 wt %, more preferably at least 0.5 wt %, most preferably at least 1 wt %, particularly preferred at least 1.5 wt %, with all weight percentages (wt %) based on the total weight of the radiation curable composition.

The amount of the liquid penetrating controlling monomer is preferably between 0.1 and 10 wt %, more preferably between 0.5 and 7.5 wt %, most preferably between 1.5 and 5 wt %, with all weight percentages (wt %) based on the total weight of the radiation curable composition.

Long Chain Alkyl (Meth)Acrylate

The long chain alkyl(meth)acrylate is a C6-C22 alkyl (meth)acrylate, more preferably a C8-C20 alkyl (meth) acrylate, most preferably a C12-C18 alkyl (meth)acrylate.

As used herein, C6-C22, C8-20, C12-C18 alkyl (meth) acrylate means an alkyl ester of (meth)acrylic ester having alkyl group of respectively 6 to 22, 8 to 20 and 12 to 18 carbon atoms.

An alkyl chain referred to herein may include a linear, branched or cyclic alkyl group.

Examples of such alkyl (meth) acrylates include lauryl (meth)acrylate, myristyl (meth)acrylate, cetyl (meth)acrylate, dodecyl (meth)acrylate, tridecyl (meth)acrylate, tetradecyl (meth)acrylate, pentadecyl (meth)acrylate, hexadecyl (meth)acrylate, stearyl (meth)acrylate, docosyl (meth)acrylate or icosyl (meth)acrylate.

A particularly preferred long chain acrylate is lauryl acrylate.

A mixture of different long chain alkyl (meth)acrylate may be used.

Fluorinated (Meth)Acrylate

A fluorinated (meth)acrylate as used herein means a (meth)acrylate comprising an alkyl chain functionalized with a fluorine atom, preferably functionalized with at least 2 fluorine atoms, more preferably functionalized with at least 3 fluorine atoms.

An alkyl chain referred to herein may include a linear, branched or cyclic alkyl group.

Examples of fluorinated polymerizable compounds include 2,2,2-trifluoroethyl-α-fluoroacrylate (TFEFA), 2,2,2-trifluoroethyl-methacrylate (TFEMA), 2,2,3,3-tetrafluoropropyl-α-fluoroacrylate (TFPFA), 2,2,3,3-tetrafluoropropyl-methacrylate (TFPMA), 2,2,3,3,3 pentafluoropropyl-a-fluoroacrylate (PFPFA), 2,2,3,3,3 pentafluoropropyl-methacrylate (PFPMA), 1H,1H-perfluoro-n-octyl acrylate, 1H,1H-perfluoro-n-decyl acrylate, 1H,1H-perfluoro-n-octyl methacrylate, 1H,1H-perfluoro-n-decyl methacrylate, 1H,1H,6H,6H-perfluoro-1,6-hexanediol diacrylate, 1H,1H,6H,6H-perfluoro-1,6-hexanediol dimethacrylate, 2-(N-butylperfluorooctanesulfonamido)ethyl acrylate, 2 (N ethyl perfluorooctanesulfonamido) ethyl acrylate, 2 (N ethyl perfluorooctanesulfonamido) ethyl methacrylate, $C_8F_{17}CH_2CH_2OCH_2CH_2\text{-OOC-CH}{=}CH_2$ and $C_8F_{17}CH_2CH_2OCH_2CH_2\text{-OOC-C}(CH_3){=}CH_2$.

Preferred fluorinated (meth)acrylates are the MEGAFACE™ RS series available from DIC Corporation such MEGAFACE™ RS-75, MEGAFACE™ RS-72-K, MEGAFACE™ RS-76-E, MEFAFACE™ 76-NS, MEGAFACE™ 78, MEGAFACE™ RS-90, MEFAFACE™ RS-55, MEFAFACE™ RS-56.

A particularly preferred fluorinated (meth)acrylate is 2,2,2-trifluoroethyl-methacrylate.

A mixture of different fluorinated (meth)acrylates may be used.

Silicone (Meth)Acrylate

A silicone (meth)acrylate as used herein means a (meth) arylate comprising at least one group comprising a Si atom.

A preferred silicone (meth)acrylate has a chemical structure according to Formula S-1, Formula S-1

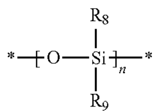

wherein $R_8$ and $R_9$ independently from each other represent an optionally substituted alkyl group or optionally substituted aryl group;

n represents an integer between 1 and 50.

Preferably R8 and R9 represent an alkyl group, more preferably a methyl group.

Preferably n represents an integer between 1 and 25, more preferably between 2 and 15.

A preferred silicone acrylate is a polyether modified (meth)acrylated polydimethylsiloxane or a polyester modified (meth)acrylated polydimethylsiloxane.

Preferred commercially available silicone (meth)acrylates include: Ebecryl™ 350 , a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, *legoTM* RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ 0701T all manufactured by Chisso Corporation; DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc, and SILMER™ ACR D208, SILMER™ Di-50, SILMER™ Di1508, SILMER™ Di-2510, SILMER™ Di-4515-0, SILMER™ ACR Di-10, all manufactured by Siltech.

A mixture of different silicone (meth)acrylates may be used.

Other Monomers

The radiation curable composition may in addition to the monomers described above comprise other monomers, oligomers and/or prepolymers.

In a preferred embodiment, such monomers, oligomers or prepolymers include an acrylate group as polymerizable group.

Preferred monomers and oligomers are those listed in paragraphs [0106] to [0115] in EP-A 1911814.

The other monomers are preferably monofunctional monomers, more preferably monofunctional acrylates or methacrylates.

Photoinitiators

The radiation curable composition preferably contains a photoinitiator.

A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J.V., et al. Photoinitiators for Free Radical, Cationic and Anionic Photopolymerization. 2nd edition. Edited by BRADLEY, G.. London, UK: John Wiley and Sons Ltd, 1998. p.276-293.

Specific examples of free radical photoinitiators may include, but are not limited to, the following compounds or combinations thereof: benzophenone and substituted benzophenones; 1-hydroxycyclohexyl phenyl ketone; thioxanthones such as isopropylthioxanthone; 2-hydroxy-2-methyl-1-phenylpropan-1-one; 2-benzyl-2-dimethylamino-(4-morpholinophenyl) butan-1-one; benzyl dimethylketal; bis (2,6-dimethylbenzoyl)-2,4,4-trimethylpentylphosphine oxide; 2,4,6 tri methylbenzoyl-diphenylphosphine oxide; 2,4,6-trimethoxybenzoyldiphenylphosphine oxide; and 2,4,6-trimethylbenzoyldi-phenyl phosphinate.

2-methyl-1-[4-(methyithio) phenyl]-2-morpholinopropan-1-one; 2,2-dimethoxy-1, 2-diphenylethan-1-one or 5,7-diiodo-3- butoxy-6-fluorone.

Suitable commercial free radical photoinitiators include for example the Omnirad™, Omnipol™ and Esacure™ type photoinitiators from IGM. Examples of such photoinitiators are Omnirad 379, Omnirad 369, Omnirad 819, Omnirad 184, Omnirad 2959, Omnipol ASA and Esacure KIP 150.

A preferred amount of photoinitiator is 0.1-20 wt %, more preferably 2-15 wt %, and most preferably 3-10 wt % of the total weight of the radiation curable inkjet ink.

In order to increase the photosensitivity further, the radiation curable composition may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethyl-aminobenzoate, 2-n-butoxyethyl-4-(dimethylamino) benzoate, 2-(dimethylamino)-ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

Colorants

The radiation curable composition may be a substantially colourless composition, but preferably the radiation curable composition includes at least one colorant. The colorant makes the temporary mask clearly visible to the manufacturer of conductive patters, allowing a visual inspection of quality.

The colorant may be a pigment or a dye, but is preferably a dye that is not bleached by the UV curing step during the inkjet printing process of the UV curable inkjet ink.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley - VCH, 2004. ISBN 3527305769.

Suitable pigments are disclosed in paragraphs [0128] to [0138] of WO 2008/074548.

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

Generally, dyes exhibit a higher light fading than pigments, but cause no problems on jettability. It was found that anthraquinone dyes exhibit only minor light fading under the normal UV curing conditions used in UV curable inkjet printing.

In a preferred embodiment, the colorant in the radiation curable composition is an anthraquinone dye, such as MacrolexTM Blue 3R (CASRN 325781-98-4) from LANXESS.

Other preferred dyes include crystal violet and a copper phthalocyanine dye.

In a preferred embodiment, the colorant is present in an amount of 0.5 to 6.0 wt %, more preferably 1.0 to 2.5 wt %, based on the total weight of the radiation curable composition.

Polymeric Dispersants

If the colorant in the radiation curable composition is a pigment, then the radiation curable composition preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB)
- wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP-A 1911814.

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Polymerization Inhibitors

The radiation curable composition may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone. t-butylcatechol, pyrogallol, 2,6-di-tert.butyl-4-methylphenol (=BHT) and phenothiazine may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™18 and Genorad™ 22 from Rahn AG; IrgastabTMUV10 and Irgastab™ UV22, Tinuvin™ 460 and CGS20 from Ciba Specialty Chemicals; Florstab™ UV range (UV-1, UV-2, UV-5 and UV-8) from Kromachem Ltd, Additol™ S range (S100, 5110, S120 and S130) and PTZ from Cytec Solvay Group.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total radiation curable composition.

Surfactants

The radiation curable composition may contain at least one surfactant, but preferably no surfactant is present.

The surfactant can be anionic, cationic, non-ionic, or zwitter-ionic and is usually added in a total quantity less than 1wt % based on the total weight of the radiation curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluorsurfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tego Rad 2100 from Evonik Industries.

Preferably the surfactant is present in the radiation curable inkjet ink in an amount of 0 to 0.1 wt % based on the total weight of the radiation curable inkjet ink.

Flame Retardant

The radiation curable composition may contain at least one flame retardant, but preferably no flame retardant is present.

Preferred flame retardants are inorganic flame retardants, such as Alumina Trihydrate and Boehmite, and organo-phosphor compounds, such as organo-phosphates (e.g. triphenyl phosphate (TPP), resorcinol bis (diphenylphosphate) (RDP), bisphenol A diphenyl phosphate (BADP), and tricresyl phosphate (TCP)); organo-phosphonates (e.g. dimethyl methylphosphonate (DMMP)); and organophosphinates (e.g. aluminium dimethylphosphinate).

Other preferred organo-phosphor compounds are disclosed in U.S. Pat. No. 8,,273,805.

Method of Manufacturing a Plated Article

The method of manufacturing a plated article according to the present invention includes the steps of:

- forming a protected area on a substrate by printing and curing a radiation curable composition as described above on a substrate;
- plating an unprotected area of the substrate;
- removing at least partially the cured radiation curable composition from the protected area of the substrate.

In a metal plating process a thin layer of metal is deposited on the surface of a substrate.

A plating resist is provided on a surface of a substrate by applying and curing a radiation curable composition as described above on the surface thereby forming a protected area on the surface of the substrate. Metal is then plated on unprotected surface area of the substrate. After plating, the cured radiation curable composition from the protected area of the substrate is then, at least partially, removed.

In a preferred embodiment a solution having a pH between 0.5 and 6.5, more preferably having a pH between 3.5 and 6.5, is used in the plating step.

Curing is preferably carried out using UV radiation.

Printing is preferably inkjet printing.

The stripping step wherein the cured radiation curable composition is at least partially removed is preferably carried out in an alkaline solution.

The thickness of the protected area, i.e. the printed and cured ink layer, is preferably between 5 and 50 μm, more preferably between 10 and 40 μm, most preferably between 15 and 30 μm.

It has been observed that, especially for the ENIG process described below, a thicker protective area may result in improved ENIG resistance properties.

The substrate may be a metal or another material. Metal plating may be used to decorate objects, for corrosion inhibition, to improve solderability, to harden, to reduce friction, to improve adhesion, to alter conductivity, to improve IR reflectivity, for radiation shielding, and for other purposes.

A particular preferred substrate is copper.

Metal plating may be achieved by electroplating or by electroless plating.

Electroplating is a process that uses an electric current to reduce dissolved metal cations so that they form a thin metal coating on a substrate. The substrate acts as the cathode in the process.

Examples of a metal which may be used in an electroplating process include copper, chrome, lead, nickel, gold, silver, tin, and zinc.

The thickness of the metal layer deposited obtained by electroplating may vary according to the intended use, and can be controlled by adjusting the concentration of the metal contained in the plating bath, the current density, or the like.

Electroless plating, also known as chemical or auto-catalytic plating, is a plating method that involves a chemical reaction in an aqueous solution without the use of external electrical power. The aqueous solution for the electroless process needs to contain the ions of the intended metal to be deposited and a reducing agent so that a chemical reaction can occur which has the form:

$$M^{2+} + RED_{solution} \xrightarrow{\text{catalytic\_surface}} M_{solid} + OXY_{solution}$$

In principle any hydrogen-based reducer can be used although the redox potential of the reducer half-cell must be high enough to overcome the energy barriers inherent in liquid chemistry. For example, electroless nickel plating generally uses hypophosphite as the reducer while plating of other metals like silver, gold and copper typically use low molecular weight aldehydes.

A major benefit of this approach over electroplating is that power sources are not needed thereby reducing the manufacturing cost. The technique can also plate diverse shapes and types of surface. The downside is that the plating process is usually slower and cannot create thick deposits of metal.

In a particular preferred embodiment, the plated article is a Printed Circuit Board (PCB).

In another particular preferred embodiment the plating step includes a Electroless Nickel Immersion Gold(ENIG) surface finishing.

ENIG Surface Finish

Typically, a so-called surface finish is applied to a PCB board. Such a PCB surface finish forms a critical interface between the components and the PCB. The finish protects the exposed copper circuitry from oxidation, extends PCB lifetime and provides a solderable surface when assembling (soldering) the components to the PCB.

There exist several surface finishes such as Hot Air Solder Leveling (HASL), immersion Tin, immersion silver, electrolytic Gold, organic solderability preservative (OSP), Electroless Nickel Immersion Gold (ENIG) and electroless Nickel Electroless Palladium Immersion Gold.

ENIG has become the most widespread surface finishing as it is an answer to major industry trends such as lead-free requirements and rise of complex surface components, which require flat surfaces.

ENIG is a two layer metallic coating of 2-8 μm Gold over 7-240 μm Nickel.

The Nickel coating is a barrier to the copper and is the surface to which the components are actually soldered to.

The gold coating protects the nickel coating during storage and also provides the low contact resistance required for the thin gold deposits.

Electroless Nickel refers to the electroless plating of Nickel on a palladium-catalyzed copper surface.

Electroless nickel plating is an auto-catalytic reaction that deposits an even layer of nickel-phosphorus on the copper surface.

The process involves dipping the substrate in a bath of plating solution, where a reducing agent, like hydrated sodium hypophosphite ($NaPO_2H_2.H_2O$), reacts with the material's ions to deposit the nickel alloy.

The metallurgical properties of the alloy depend on the percentage of phosphorus, which can range from 1-4% (low phosphorus) over 5-10% (medium phosphorus) to 11-14% (high phosphorus). For ENIG, a medium phosphorus electroless nickel is typically used.

Before plating, the surface of the material is cleaned by applying a series of chemicals. Unwanted solids left on the surface cause poor plating. After applying each pre-treatment chemical, the surface is rinsed two to three times with water to completely remove the chemicals.

Typical cleaning solutions are acid cleaning solution, such as Proselect SF available from Atotech, Ronaclean HCP208 available from Dow, Cleaner 865 available from Umicore, or Cleaner ACL; and microetching solutions, such as Microetch SF available from Atotech, Macuprep G4 or G5 available from Mac Dermit Enthone, or Microetch 910 available from Umicore.

After cleaning and/or microetching the copper surface, the copper surface is then activated with a solution of a noble metal, preferably palladium chloride.

Typical palladium activation baths are AuNiACT available from Atotech, Ronamerse SMT catalyst CF available from DOW, Planar preinitiator available from Mac Dermit Enthone, or Accemulta MNK 4, Accemulta MFD 5 and Activator 915 all available from Umicore, and Activator KAT 451.

Electroless Nickel deposition is carried out in a nickel plating bath, such as AuNiEN available from Atotech, Duraposit SMT820 available from DOW, Planar Ni part DF available from Mac Dermit Enthone, or NDF-2, Nimuden NPR 4 and Nimuden NPR8 version 2 all available from Umicore.

The immersion gold process is based on the oxidation (removal) of nickel and the reduction (deposition) of gold ions from the bath. As it is not an autocatalytic process as plating is, only the top layers of the Ni coating are replaced by gold.

This immersion gold process is carried out in a gold bath such as AuNic IG plus available from Atotech, Aurolectroless SMT520 available from Dow, Planar immersion gold available from Mac Dermit Enthone, or THP-14, Gobright TCL61, Gobright TAM 55 and Gobright TLA77 all available from Umicore.

The ENIG process thus consists of a lot of different steps such as cleaning, etching, activation, plating, immersion. All these steps for which dedicated baths are used are carried out at different times and temperatures. For example, the pH of the different baths may range from 0.5 (palladium activation bath) to 5.5 (gold immersion bath), a temperature of 85° C. is used for the Nickel plating and gold immersion.

The many steps necessary to carry out the ENIG process makes that the total time of the process may be more than 1 hour.

The protected area on the PCB formed by the plate resist must resist these harsh conditions of the ENIG process. For example, the protected area may not be removed during the ENIG process. It has been observed that especially the gold immersion treatment using a bath having a relatively high pH (between 3.5 and 65.) is a critical treatment towards the protecting ink layers.

However, after completion of the ENIG process, the protected area is, at least partially, removed from the substrate in a so-called stripping bath.

Removal of Etch or Plating Resist

After plating, the cured radiation composition must at least partially be removed from the surface. In a preferred embodiment, the cured radiation curable composition is completely removed from the surface.

The removal may be accomplished by stripping or solubilizing the cured radiation composition.

The cured radiation curable composition according to the present invention is removed by an alkaline solution, referred to as stripping bath.

Such an alkaline stripping bath is usually an aqueous solution having a pH between 8 and 14, preferably having a pH of more than 9, more preferably more than 10, most preferably more than 11.

Inkjet Printing Devices

The radiation curable inkjet ink may be jetted by one or more print heads ejecting small droplets in a controlled manner through nozzles onto a substrate, which is moving relative to the print head(s).

A preferred print head for the inkjet printing system is a piezoelectric head.

Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head.

However, the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a higher throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

Curing Devices

The radiation curable inkjet ink can be cured by exposing them to actinic radiation, such as electron beam or ultraviolet radiation. Preferably the radiation curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm.

In a preferred embodiment, the radiation curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Also, for facilitating curing, after the UV curing step, a thermal step may be applied to the protective layer.

EXAMPLES

Materials

All materials used in the following examples were readily available from standard sources such as ALDRICH CHEMICAL Co. (Belgium) and ACROS (Belgium) unless otherwise specified. The water used was deionized water.

ACMO is acryloyl morpholine available from Rahn.

CEA 70LS is 2-carboxyethylacrylate available as Miramer CEA from Miwon Specialty Chemical Co.

CN146 is an acidic monofunctional acrylic oligomer available from Arkema.

AAG is Acrylic Acid Glacial available from BASF SE.

NPG-HPD is neopentylglycol hydroxypivalate diacrylate available as Sartomer™ SR606A from Arkema.

ITX is Speedcure™ ITX, a mixture of isopropyl thioxanthone isomers from Lambson.

TPO-L is Speedcure™ TPO-L, ethyl(2,4,6-trimethyl benzoyl)phenyl phosphinate from Lambson.

EHDBA is 4-dimethylamine-benzoic acid 2-ethyl-hexyl ester available from as Genocure™ EHA from Rahn.

Contrast is Macrolex blue 3R supplied by Bayer A.G.

INHIB is a mixture forming a polymerization inhibitor having a composition according to Table 4.

TABLE 4

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

DPGDA is dipropylenediacrylate, available as Sartomer SR508 from ARKEMA.

Cupferron™ AL is aluminum N-nitrosophenylhydroxylamine from WAKO CHEMICALS.

Light Ester M 3F is a trifluoroethyl methacrylate available from KYOEISHA CHEMICAL Co.

Light Acrylate LA is a lauryl acrylate available from KYOEISHA CHEMICAL Co.

Light Acrylate SA is a stearyl acrylate available from KYOEISHA CHEMICAL Co.

Megaface RS 76 E is an oligomer with fluoro, hydrophilic, lipophilic and UV reactive group in MEK/Ethylacetate/MIBK available from DIC corporation.

Megaface RS 76 NS is an oligomer with fluoro, hydrophilic, lipophilic and UV reactive group in DPGDA available from DIC corporation.

Silmer ACR DI-1508 is a water-dispersible di-functional silicone acrylate prepolymer available from Siltech Corp.

Silmer ACR DI-2510 is a 100% active cross-linkable silicone acrylate pre-polymer available from Siltech Corp.

Mecbrite CA-95MH is a micro etch cleaner available from MEC Europe.

Umicore cleaner 865 is a cleaning solution for copper surfaces available from Umicore.

Accemulta MNK-4-M is a palladium catalyst for PCB applications available from Umicore.

Nimuden NPR-4 is an acid electroless nickel plating bath for PCB applications available from Umicore.

Gobright TAM-55 is an immersion gold bath for PCB applications available from Umicore.

Methods

Pre-Treatment Substrates

First of all, the substrates (e.g. PCB boards) were baked during 1 hour in an oven at 150° C.

Then the surfaces were treated by using the microetching bath Mecbrite CA-95MH in a rotaspray to give to the copper a specific roughness necessary to get a good adhesion of the ink.

A thickness of around 1 μm of copper was removed from the substrates and was done by spraying the microetching solution during 60 s at 22-24° C.

The substrates were then immediately rinsed during 90 s with sprays of demineralized water to stop the microetching.

Finally, the substrates were dried as fast as possible with an air flow to avoid the formation of copper oxides.

Inkjet Pintinq

The inkjet inks were printed with a Microcraft MJP2013K1 printer equipped with a Konica Minolta print head (KM1024 SHB) on a PCB board. Then the ink was printed at 45° C. on the pretreated substrates with a resolution of 720×1440 dpi with 4 to 12 passes, to reach a given layer thickness, with a pincure (UV LED, 395 nm, 8 W lamp power) between 5% and 100% followed by an extra pass with a pincure of 100%. The ink is printed only on the part which have to be protected from the plating process, i.e. all the copper part on which nickel and gold is not needed. The ink is always printed on both solder mask and copper.

ENIG plating

First of all, the boards were dipped in a bath of acid cleaner (Umicore cleaner 865) at 40° C. during 4 min. The boards were then removed and dipped in a rinsing bath of deionized water (DW) at room temperature (RT) during 90 s.

Secondly the boards were dipped in a microetching bath comprising 8.5 wt % $Na_2S_2O_8$ and ±3.2 wt % $H_2SO_4$ (98%) in water at a temperature between 26-33° C. for 100 s. The boards were then removed and dipped in a rinsing bath of DW at RT during 90 s.

Thirdly the boards were dipped in a palladium activator bath (Accemulta MKN 4) at a temperature around 30° C. for 90 s. The boards were then removed and dipped in a rinsing bath of DW at RT during 90 s.

Then the boards were dipped in a nickel bath (Nimuden NPR 4) at a temperature around 85° C. for 35 min. The boards were then removed and dipped in a rinsing bath of DW at RT during 90 s.

Finally, the boards were dipped in a gold bath (Gobright TAM 55) at a temperature around 80° C. for 12 min. The boards were then removed and dipped in a rinsing bath of DW at RT during 90 s.

Stripping

After the plating process the ink was removed, thanks to a stripping solution of NaOH 5%. The stripping was realized with a spraying of the NaOH solution at 50° C. for a time during 1 to 5 min. When the ink is fully cleaned boards were rinsed with DW during 90 s.

The selective ENIG is then achieved and the boards can go to the next step of the PCB manufacturing.

ENIG Resistance

The ENIG resistance of a printed inkjet ink was evaluated using a score from 0 (good) to 4 (bad):

0 means no damage to the ink layer 1 means the occurrence of bubbles beneath an intact ink layer 2 means partly removal of the ink layer 3 means complete removal of the ink layer Stripping The stripping behavior of the printed inkjet ink was evaluated visually using the following score:

+ means that the ink is completely removed after stripping;

– means that the ink is not or only partly removed after stripping.

Example 1

The comparative and inventive radiation curable compositions COMP-01 and INV-01 to INV-06 were prepared according to Table 5. The weight percentages (wt %) are all based on the total weight of the radiation curable composition.

TABLE 5

| wt % of component | COMP-01 | INV-01 | INV-02 | INV-03 | INV-04 |
|---|---|---|---|---|---|
| ACMO | 29.5 | = | = | = | = |
| CEA70LS | 3.0 | = | = | = | = |
| CN146 | 4.0 | = | = | = | = |
| Acrylic acid glacial | 8.0 | = | = | = | = |
| NPG-HDP | 43.55 | 38.55 | = | = | 42.55 |
| Light Ester M 3F | – | 5.00 | – | – | – |
| Light Acrylate SA | – | – | 5.00 | – | – |
| Light Acrylate LA | – | – | – | 5.00 | – |
| Megaface RS 76 E | – | – | – | – | 1.00 |
| Megaface RS-76-NS | – | | | | |
| Silmer ACR DI 1508 | – | | | | |
| INHIB | 1.0 | = | = | = | = |
| Contrast | 1.0 | = | = | = | = |
| ITX | 4.0 | = | = | = | = |
| EHDBA | 3.0 | = | = | = | = |
| TPO-L | 2.95 | = | = | = | = |

| wt % of component | INV-05 | INV-06 |
|---|---|---|
| ACMO | 29.5 | = |
| CEA70LS | 3.0 | = |
| CN146 | 4.0 | = |
| Acrylic acid glacial | 8.0 | = |
| NPG-HDP | 42.55 | 42.05 |
| Megaface RS-76-NS | 1.00 | – |
| Silmer ACR DI 1508 | – | 1.50 |
| INHIB | 1.0 | = |
| Contrast | 1.0 | = |
| ITX | 4.0 | = |
| EHDBA | 3.0 | = |
| TPO-L | 2.95 | = |

The radiation curable compositions were printed and cured as described above. The ENIG resistance and Strippability, evaluated as described above, are summarized in Table 6 for the samples pincured with a lamp power of 5% between each pass and with a final curing pass of 100%.

TABLE 6

| | ENIG resistance | Strippability |
|---|---|---|
| COMP-01 | 2 | + |
| INV-01 | 0 | + |
| INV-02 | 0 | + |
| INV-03 | 0 | + |
| INV-04 | 0 | + |
| INV-05 | 0 | + |
| INV-06 | 0 | + |

From Table 6 it becomes clear that the radiation curable compositions according to the present invention are performing well in the ENIG process.

Example 2

This example illustrates the influence of the thickness of the ink layer on the ENIG resistance.

The UV curable inkjet inks of Example 1 were printed as described above but now at different passes at a resolution of 720×1440 dpi. 4 passes correspond to a thickness between 5 and 10 μm, 8 passes correspond to a thickness between 15 and 20 μm.

The ENIG resistance and Strippability, evaluated as described above, are summarized in Table 7.

TABLE 7

| | ENIG resistance | | Strippability | |
|---|---|---|---|---|
| | 4 passes | 8 passes | 4 passes | 8 passes |
| COMP-01 | 2 | 2 | + | + |
| INV-01 | 2 | 0 | + | + |
| INV-02 | 2 | 0 | + | + |
| INV-03 | 3 | 0 | + | + |
| INV-04 | 0 | 0 | + | + |
| INV-05 | 1 | 0 | + | + |
| INV-06 | 1 | 0 | + | + |

From Table 7 it becomes clear that the ENIG resistance of 8 passes layers of ink is better compared to the ENIG resistance of 4 passes layers of ink. The strippability of both layers is sufficient.

Example 3

This example illustrates the influence of the thickness of the ink layer on the ENIG resistance and stripping on a PCB board with high gaps or highly variable topography.

The inventive radiation curable compositions INV-07 and INV-08 were prepared according to Table 8. The weight percentages (wt %) are all based on the total weight of the radiation curable composition.

TABLE 8

| wt % of component | INV-07 | INV-08 |
|---|---|---|
| ACMO | 29.5 | = |
| CEA70LS | 3.0 | = |
| CN146 | 4.0 | = |
| Acrylic acid glacial | 8.0 | = |
| NPG-HDP | 43.55 | 41.55 |
| Light Ester M 3F | 5.00 | – |
| Silmer ACR DI 2510 | – | 2.00 |
| INHIB | 1.0 | = |
| Contrast | 1.0 | = |
| ITX | 4.0 | = |
| EHDBA | 3.0 | = |
| TPO-L | 2.95 | = |

Layers with a different thickness of the UV curable inkjet inks INV-07 and INV-08 were printed as described above. 8 passes correspond to a thickness between 15 and 20 μm, 12 passes correspond to a thickness between 25 and 30 μm.

The ENIG resistance and Strippability, evaluated as described above, are summarized in Table 9.

TABLE 9

| | ENIG resistance | | Strippability | |
|---|---|---|---|---|
| | 8 passes | 12 passes | 8 passes | 12 passes |
| INV-07 | 1 | 0 | + | + |
| INV-08 | 1 | 0 | + | + |

From Table 9 it becomes clear that the ENIG resistance of 12 passes layers of ink is better compared to the ENIG resistance of 8 passes μm layers of ink. The strippability of both layers is sufficient.

The invention claimed is:

1. A radiation curable composition comprising:

a) at least one monofunctional (meth)acrylate containing a carboxylic acid group, a phosphoric acid group, or a phosphonic acid group;

b) acryloyl morpholine;

c) at least one polyfunctional (meth)acrylate; and d) a photoinitiator, wherein the radiation curable composition further comprises at least 0.1 wt % of a liquid penetrating controlling monomer selected from the group consisting of a fluorinated (meth)acrylate and a silicone (meth)acrylate.

2. The radiation curable composition of claim 1, wherein the amount of liquid penetrating controlling monomer is at least 1 wt % relative to the total weight of the composition.

3. The radiation curable composition of claim 1, wherein the monofunctional (meth)acrylate containing a carboxylic acid group, a phosphoric acid group or a phosphonic acid group is selected from the group consisting of acrylic acid, 2-carboxyethyl acrylate, 2-acryloyl ethyl succinate, and 2-hydroxyethyl methacrylate phosphate.

4. The radiation curable composition of claim 1, wherein the polyfunctional (meth)acrylate is selected from the group consisting of dipropylene glycol diacrylate, neopentylglycol diacrylate, neopentylglycol (2x propoxylated) diacrylate, penta erythritol tetra acrylate, 1,6-hexanediol diacrylate, trimethylolpropane trimethacrylate, ethoxylated trimethylpropane triacrylate, tripropylene glycol diacrylate, ditrimethyloylpropane tetraacrylate, ethoxylated pentaerythritol tetraacrylate, neopentylglycol hydroxyl pivalate diacrylate, and polyethyleneglycol diacrylate.

5. The radiation curable composition of claim 1, wherein the composition is a UV curable inkjet ink.

6. A method of manufacturing a plated article, the method comprising:

forming a protected area on a substrate by printing and curing a radiation curable composition as defined in claim 1 on the substrate;

plating an unprotected area of the substrate; and stripping at least partially the cured radiation curable composition from the protected area of the substrate.

7. The method of manufacturing a plated article of claim 6, wherein a solution having a pH between 3.5 and 6.5 is used in the plating step.

8. The method of manufacturing a plated article of claim 6, wherein the substrate is copper.

9. The method of manufacturing a plated article of claim 6, wherein the plated article is a Printed Circuit Board (PCB).

10. The method of manufacturing a plated article of claim 6, wherein the plating step includes a Electroless Nickel Immersion Gold (ENIG) surface finishing.

11. The method of manufacturing a plated article of claim 6, wherein curing is carried out using UV radiation.

12. The method of manufacturing a plated article of claim 6, wherein the stripping step is carried out in an alkaline solution.

13. The method of manufacturing a plated article of claim 6, wherein the thickness of the protected area is at least 15 μm.

* * * * *